United States Patent
Sugihara

(10) Patent No.: US 10,745,544 B2
(45) Date of Patent: Aug. 18, 2020

(54) RUBBER COMPOSITION FOR HOSES, AND HOSE

(71) Applicant: The Yokohama Rubber Co., LTD., Minato-ku, Tokyo (JP)

(72) Inventor: Koki Sugihara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 159 days.

(21) Appl. No.: 15/743,250

(22) PCT Filed: Jul. 1, 2016

(86) PCT No.: PCT/JP2016/069678
§ 371 (c)(1),
(2) Date: Jan. 9, 2018

(87) PCT Pub. No.: WO2017/010324
PCT Pub. Date: Jan. 19, 2017

(65) Prior Publication Data
US 2018/0201766 A1    Jul. 19, 2018

(30) Foreign Application Priority Data

Jul. 13, 2015 (JP) ................................. 2015-139807
Oct. 23, 2015 (JP) ................................. 2015-209191

(51) Int. Cl.
*C08L 9/02* (2006.01)
*F16L 11/04* (2006.01)
*F16L 11/08* (2006.01)

(52) U.S. Cl.
CPC .................. *C08L 9/02* (2013.01); *F16L 11/04* (2013.01); *F16L 11/08* (2013.01); *F16L 11/082* (2013.01); *F16L 11/086* (2013.01); *C08L 2205/025* (2013.01)

(58) Field of Classification Search
CPC .............. C08L 9/02; F16L 11/04; F16L 11/08

USPC ......................................................... 524/314
See application file for complete search history.

(56) References Cited

U.S. PATENT DOCUMENTS

| | | | |
|---|---|---|---|
| 6,220,304 B1 * | 4/2001 | Horiba | B60T 17/043 138/126 |
| 2015/0083297 A1 | 3/2015 | Inata et al. | |
| 2015/0183970 A1 | 7/2015 | Yokohama Rubber | |
| 2015/0368448 A1 * | 12/2015 | Kawai | C08L 9/02 138/139 |

FOREIGN PATENT DOCUMENTS

| | | |
|---|---|---|
| CN | 104395378 A | 3/2015 |
| JP | H10-231389 | 9/1998 |
| JP | 2000-351874 | 12/2000 |
| JP | 2003-090465 * | 3/2003 |
| JP | 2004-250696 | 9/2004 |
| JP | 2006-016523 | 1/2006 |
| JP | 2014-009333 | 1/2014 |
| WO | WO 2013/186827 | 12/2013 |
| WO | WO 2014/007220 | 1/2014 |
| WO | WO2014/126015 * | 8/2014 |

OTHER PUBLICATIONS

International Search Report for International Application No. PCT/JP2016/069678 dated Sep. 27, 2016, 4 pages, Japan.
Handbook of Common Raw Materials for Fine Chemical Formulations, Guangdong Science and Technology Publishing House, Mar. 31, 1998, pp. 160-162, 13 pages, China.
Chinese Office Action for Chinese Application No. 201680026691.X dated Jan. 2, 2020, 12 pages, China.

* cited by examiner

*Primary Examiner* — Deve V Hall
(74) *Attorney, Agent, or Firm* — Thorpe North & Western

(57) ABSTRACT

Provided are a rubber composition for hoses containing acrylonitrile butadiene rubber, a filler, a resorcin-formaldehyde precondensate, an aldehyde-ammonia vulcanization accelerator, and a fatty acid diester, and a hose including a layer formed using the same.

8 Claims, 1 Drawing Sheet

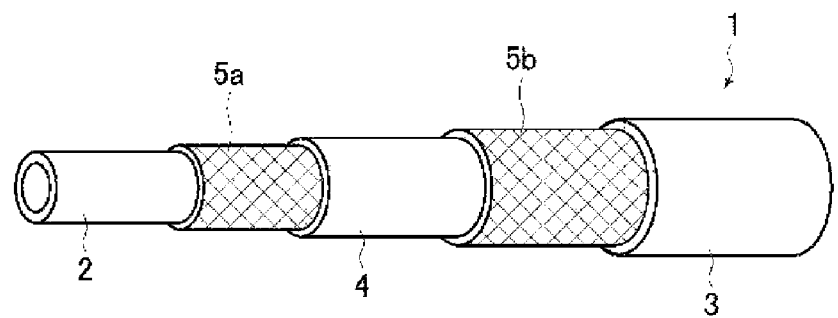

RUBBER COMPOSITION FOR HOSES, AND HOSE

TECHNICAL FIELD

The present technology relates to a rubber composition for hoses and a hose.

BACKGROUND ART

Conventionally, hoses including, for example, inner tube rubber, outer tube rubber, and a reinforcing layer between the inner tube rubber and the outer tube rubber are used for hoses and the like used in construction machinery and the like. An example of the reinforcing layer includes, for example, a plurality of reinforcing steel wire layers formed by braiding wire or the like, and inter-layer rubber (insulation rubber) between the plurality of reinforcing steel wire layers. A rubber composition containing, for example, acrylonitrile butadiene rubber (NBR) is used as the inter-layer rubber (see, for example, Japanese Unexamined Patent Application Publication No. 2004-250696).

A preparation and evaluation of rubber compositions containing acrylonitrile butadiene rubber performed by the inventor of the present technology on the basis of Japanese Unexamined Patent Application Publication No. 2004-250696 revealed that such rubber compositions are highly fluid when heated, and the rubber composition may seep through to the exterior of the hose.

SUMMARY

The present technology provides a rubber composition for hoses in which flowability is more effectively suppressed.

The inventor discovered that the prescribed effects can be obtained by a rubber composition for hoses including a fatty acid diester as a plasticizer, thereby arriving at the present technology, described by the following features.

1. A rubber composition for hoses containing acrylonitrile butadiene rubber, a filler, a resorcin-formaldehyde precondensate, an aldehyde-ammonia vulcanization accelerator, and a fatty acid diester.
2. The rubber composition for hoses according to 1, wherein the total number of carbon atoms making up the fatty acid diester is at least 12.
3. The rubber composition for hoses according to 1 or 2, wherein a fatty acid diester content is 5 to 15 parts by mass per 100 parts by mass of the acrylonitrile butadiene rubber.
4. A hose including a layer formed using the rubber composition for hoses according to any of 1 to 3.

In accordance with the present technology, it is possible to provide a rubber composition for hoses in which flowability is more effectively suppressed. It is also possible to provide a hose in accordance with the present technology.

BRIEF DESCRIPTION OF DRAWING

FIG. 1 is a partial cut-away perspective view of the layers of one example of a hose according to the present technology.

DETAILED DESCRIPTION

The present technology will now be described in detail.

Note that, in the present description, numerical ranges indicated using "(from) . . . to . . . " include the former number as the minimum value and the later number as the maximum value.

In the present description, when a component contains two or more types of substances, the content of said component is the total content of the two or more types of substances.

Rubber Composition for Hoses

The rubber composition for hoses according to the present technology (the rubber composition according to the present technology) is a rubber composition for hoses containing acrylonitrile butadiene rubber, a filler, a resorcin-formalin precondensate, an aldehyde-ammonia vulcanization accelerator, and a fatty acid diester.

The rubber composition of the present technology is thought to yield the desired effects as a result of having such features. The reasons for this are unclear, but are presumably more or less as follows.

Generally, plasticizers such as dioctyl phthalate and fatty acid diesters are highly compatible with acrylonitrile butadiene rubber.

In particular, because the carboxylic acid moiety of dioctyl phthalate includes an aromatic hydrocarbon group, it is believed that, in a comparison of dioctyl phthalate and a fatty acid diester, dioctyl phthalate has a greater potential than a fatty acid diester to sterically hinder crosslinks in the rubber during initial crosslinking of a rubber composition.

In contrast, when the carboxylic acid moiety includes an aliphatic hydrocarbon group, as in the case of a fatty acid diester, a vulcanization reaction readily occurs without hindrance during initial crosslinking; thus, the rubber composition according to the present technology is capable of extremely effectively suppressing flowability.

Each of the components contained in the rubber composition of the present technology will be described in detail hereafter.

Acrylonitrile Butadiene Rubber

There is no particular limitation on the acrylonitrile butadiene rubber (NBR) contained in the rubber composition according to the present technology as long as it is a copolymer of acrylonitrile and butadiene.

From the perspective of even better effects of the present technology, the acrylonitrile content of the NBR is preferably 10 to 33 mass %, even more preferably 18 to 21 mass %, with respect to the total NBR content. In the present technology, the acrylonitrile content of the NBR is as measured according to a semimicro-Kjeldahl method as per JIS (Japanese Industrial Standard) K 6384.

If multiple types of NBR are used, the average acrylonitrile content with respect to the total NBR content may be in the aforementioned range.

From the perspective of even better effects of the present technology, the Mooney viscosity of the NBR is preferably 40 to 70, and more preferably 45 to 65. In the present technology, the Mooney viscosity of the NBR is as measured using a type-L rotor at a preheating time of one minute, a rotor rotation time of four minutes, and a test temperature of 100° C. as set forth in JIS K 6300-1:2013.

If multiple types of NBR are used, the average Mooney viscosity of the acrylonitrile butadiene rubber may be in the aforementioned range.

A single type or a combination of two or more types of NBR can be used.

Filler

There is no particular limitation on the filler contained in the rubber composition according to the present technology. Examples include carbon black, and inorganic fillers (other than carbon black) such as silica, clay, talc, calcium carbonate, mica, and diatomaceous earth.

From the perspective of even better effects of the present technology, carbon black, silica, or talc is preferable, and at least one type selected from the group consisting of carbon black and silica is more preferable.

Examples of carbon black include those types that can be used in rubber compositions.

Specific examples include fine thermal furnace (FTF) grade, fast extruding furnace (FEF) grade, general purpose furnace (GPF) grade, semi-reinforcing furnace (SRF) grade, and high abrasion furnace (HAF) grade carbon black.

A single type or a combination of two or more types of carbon black can be used.

From the perspective of even better effects of the present technology, an example of a preferred aspect is one in which the carbon black combination includes carbon black 1 having an average particle size of 25 to 36 μm and carbon black 2 having an average particle size of greater than 36 μm (preferably greater than 39 μm) up to 250 μm. In the present technology, the average particle size of the carbon black is the arithmetic mean value for the diameter of particles photographed using an electron microscope.

Examples of silica include crystalline silica, precipitated silica, and amorphous silica (e.g., high-temperature-treated silica).

A single filler or a combination of two or more fillers can be used.

From the perspective of even better effects of the present technology and superior adhesiveness, the filler content is preferably 80 to 120 parts by mass, more preferably 90 to 115 parts by mass, still more preferably 100 to 115 parts by mass, per 100 parts by mass of the acrylonitrile butadiene rubber.

If the rubber composition according to the present technology contains an inorganic filler other than carbon black, the inorganic filler content is preferably 15 to 30 parts by mass, more preferably 20 to 25 parts by mass, per 100 parts by mass of the acrylonitrile butadiene rubber from the perspective of even better effects of the present technology and superior adhesiveness.

If the rubber composition according to the present technology contains carbon black and the abovementioned inorganic filler (for example, silica), the mass ratio (carbon black/inorganic filler) of carbon black to the inorganic filler is preferably 2 to 10, more preferably 3 to 5, from the perspective of even better effects of the present technology and superior adhesiveness.

Resorcin-Formaldehyde Precondensate

The inclusion of a resorcin-formaldehyde precondensate in the rubber composition according to the present technology allows flowability to be suppressed.

There is no particular limitation on the resorcin-formaldehyde precondensate contained in the rubber composition according to the present technology as long as it contains at least a condensation product (resorcin-formaldehyde econdensate) of resorcin (resorcinol) and formaldehyde (formalin).

The resorcin-formaldehyde precondensate may be a condensate including a formaldehyde-derived unit and a resorcin-derived unit wherein the formaldehyde-derived unit is in a stochiometrically insufficient or excess state.

The resorcin-formaldehyde precondensate may be either a novolac or a resole.

An example of a preferred aspect is one in which the resorcin-formaldehyde precondensate is a novolac.

A novolac resorcin-formaldehyde precondensate can be cured, for example, by heat or an acid.

An example of a preferred aspect is one in which the resorcin-formaldehyde precondensate does not contain rubber latex.

There is no particular limitation on the method of producing the resorcin-formaldehyde precondensate. Examples include conventionally known methods. A specific example is a method of condensing resorcin and formaldehyde in the presence of a catalyst.

A novolac resorcin-formaldehyde precondensate can be obtained, for example, by reacting resorcin and formaldehyde at a molar ratio of 1/0.8 to 0.9 using an acid as a catalyst. Examples of acid catalysts include oxalic acid and divalent metal salts.

A resole resorcin-formaldehyde precondensate can be obtained, for example, by reacting resorcin and formaldehyde at a molar ratio of 1/1 to 3 using an alkali as a catalyst. Examples of alkali catalysts include sodium hydroxide, sodium carbonate, alkaline earth metal hydroxides, ammonia, and tertiary amines.

From the perspective of even better effects of the present technology and superior mixing workability, storage stability, or both, the softening point of the resorcin-formaldehyde precondensate is preferably 100 to 140° C., more preferably 100 to 110° C. In the present technology, the softening point is as measured according to the ring-and-ball softening point measurement method set forth in JIS K 6220-1.

A novolac resorcin-formaldehyde precondensate can be used using a curing agent such as paraformaldehyde, hexamethylene tetramine, hexaethoxymethyl melamine hexamethoxymethyl melamine, lauryloxymethyl pyridinium chloride, ethoxymethyl pyridinium chloride, a trioxanehexamethoxymethyl melamine polymer of formaldehyde, hexakis-(methoxymethyl) melamine, N,N',N"-trimethyl/N,N',N"-trimethylol melamine, hexamethylol melamine, a hexamethylol melamine pentamethyl ether partial condensate, N-methylol melamine, N,N'-dimethylol melamine, N,N',N"-tris(methoxymethyl) melamine, or N,N',N"-tributyl-N,N',N"-trimethylol-melamine. If the type of curing agent used coincides with the aldehyde-ammonia vulcanization accelerator (e.g., hexamethylene tetramine), the curing agent content is included in the aldehyde-ammonia vulcanization accelerator.

A resole resorcin-formaldehyde precondensate can be cured, for example, by heating.

Along with a resorcin-formaldehyde condensate, the resorcin-formaldehyde precondensate may further contain at least one selected from the group consisting of resorcin and formaldehyde (hereafter referred to as "resorcin or the like").

If the resorcin-formaldehyde precondensate further contains resorcin or the like, said resorcin or the like may be unreacted feedstock material used to produce the resorcin-formaldehyde precondensate. Alternatively, the resorcin or the like may be added to the resorcin-formaldehyde precondensate.

Along with a resorcin-formaldehyde condensate, the resorcin-formaldehyde precondensate may further contain water. The water content is preferably 0 to 1 mass % with respect to the total mass of resorcin-formaldehyde precondensate.

From the perspective of even better effects of the present technology, the resorcin-formaldehyde precondensate content is preferably 2.0 to 6.0 parts by mass, more preferably 2.5 to 4.0 parts by mass, per 100 parts by mass of the acrylonitrile butadiene rubber.

If the resorcin-formaldehyde precondensate further contains water in addition to a resorcin-formaldehyde condensate, the resorcin-formaldehyde precondensate content does not include the water contained in the resorcin-formaldehyde precondensate.

If the resorcin-formaldehyde precondensate further contains at least one selected from the group consisting of resorcin and formaldehyde in addition to a resorcin-formaldehyde condensate, the resorcin-formaldehyde precondensate content includes the at least one selected from the group consisting of resorcin and formaldehyde.

If the resorcin-formaldehyde precondensate contains a resorcin-formaldehyde condensate and at least one selected from the group consisting of resorcin and formaldehyde, the resorcin-formaldehyde condensate content is preferably at least 50 mass %, more preferably at least 60 mass % but less than 100 mass %, with respect to the resorcin-formaldehyde precondensate content (total mass of resorcin-formaldehyde condensate and at least one selected from the group consisting of resorcin and formaldehyde) from the perspective of even better effect of the present technology.

Aldehyde-Ammonia Vulcanization Accelerator

There is no particular limitation on the aldehyde-ammonia vulcanization accelerator contained in the rubber composition according to the present technology as long as it is an aldehyde-ammonia vulcanization accelerator that can be used in rubber compositions.

In the rubber composition according to the present technology, the aldehyde-ammonia vulcanization accelerator is capable of acting as a vulcanization accelerator.

In the present technology, if the resorcin-formaldehyde precondensate is a novolac resorcin-formaldehyde precondensate and the aldehyde-ammonia vulcanization accelerator is hexamethylene tetramine or the like, the hexamethylene tetramine or the like is capable of acting as a curing agent for the novolac resorcin-formaldehyde precondensate.

The aldehyde-ammonia vulcanization accelerator can be obtained, for example, by reacting an aldehyde and ammonia. There is no particular limitation on the aldehyde.

Examples of the aldehyde-ammonia vulcanization accelerator include hexamethylene tetramine and acetaldehyde ammonia.

A single aldehyde-ammonia vulcanization accelerator or a combination of two or more types can be used.

From the perspective of even better effects of the present technology and superior workability, storage stability, adhesiveness, or all, the aldehyde-ammonia vulcanization accelerator content is preferably 1 to 2 parts by mass, more preferably 1.5 to 1.8 parts by mass, per 100 parts by mass of the acrylonitrile butadiene rubber.

If the resorcin-formaldehyde precondensate is a novolac resorcin-formaldehyde precondensate and the aldehyde-ammonia vulcanization accelerator is hexamethylene tetramine or the like, the hexamethylene tetramine or the like is capable of acting as a curing agent for the novolac type. Thus, from the perspective of even better effects of the present technology and superior workability, storage stability, adhesiveness, or all three, the hexamethylene tetramine, etc., the content of the hexamethylene tetramine, or the like is preferably 1 to 3 parts by mass, more preferably 1 to 2 parts by mass, per 100 total parts by mass of the acrylonitrile butadiene rubber and resorcin-formaldehyde precondensate.

Fatty Acid Diester

There is no particular limitation on the fatty acid diester contained in the rubber composition according to the present technology as long as it is a diester of a fatty acid including multiple carboxylic acids.

Fatty Acid

An example of a preferred aspect is one in which the fatty acid making up the fatty acid diester is an aliphatic hydrocarbon including multiple carboxylic acids.

There is no particular limitation on the aliphatic hydrocarbon as long as it is an at least divalent aliphatic hydrocarbon group. The aliphatic hydrocarbon group may be either straight-chain or branched, may include an unsaturated bond, and may include a heteroatom, such as an oxygen atom, a nitrogen atom, a sulfur atom, or a halogen atom, in addition to the carboxylic acids.

The aliphatic hydrocarbon group is preferably straight-chain or branched. The aliphatic hydrocarbon group is preferably an alkylene group.

The number of carbon atoms in the aliphatic hydrocarbon group may be 1 to 20, preferably 1 to 10, more preferably 2 to 5.

The fatty acid preferably includes two carboxylic acids per molecule.

Ester

There is no particular limitation on the hydrocarbon group bonded to the ester bond making up the fatty acid diester. The hydrocarbon group may be straight-chain, branched, or cyclic, may include an unsaturated bond, and may include a heteroatom such as an oxygen atom, a nitrogen atom, a sulfur atom, or a halogen atom. An example of the hydrocarbon group is an aliphatic hydrocarbon group (which may be any of straight-chain, branched, or cyclic).

In particular, the hydrocarbon group is preferably an aliphatic hydrocarbon group, and more preferably a straight-chain or branched alkyl group. The number of carbon atoms in the alkyl group may be 1 to 20, preferably 1 to 10.

The hydrocarbon groups bonded to the two ester bonds making up the fatty acid diester may be identical or different.

From the perspective of even better effects of the present technology and superior compatibility with the NBR, the total number of carbon atoms making up the fatty acid diester is preferably at least 12, preferably 12 to 32.

From the perspective of even better effects of the present technology and compatibility with the NBR, the fatty acid diester is preferably a fatty acid dialkyl ester, more preferably an adipic acid dialkyl ester.

Examples of adipic acid dialkyl esters include an adipic acid dioctyl ester and an adipic acid diisononyl ester.

A single type or a combination of two or more types of fatty acid diester can be used.

From the perspective of even better effects of the present technology and superior mixing workability, rolling workability, or both, the fatty acid diester content is preferably 10 to 15 parts by mass, more preferably 10 to 12.5 parts by mass, per 100 parts by mass of the acrylonitrile butadiene rubber.

From the perspective of even better effects of the present technology and superior mixing workability, rolling workability, or both, the fatty acid diester content is preferably 9.5 to 14.6 parts by mass, more preferably 9.5 to 12.2 parts by mass, per 100 total parts by mass of the acrylonitrile butadiene rubber and resorcin-formaldehyde precondensate.

From the perspective of even better effects of the present technology and superior mixing workability, storage stability, or both, the mass ratio (resorcin-formaldehyde precondensate/acrylonitrile butadiene rubber) of resorcin-formaldehyde precondensate to acrylonitrile butadiene rubber is preferably 0.02 to 0.06, more preferably 0.025 to 0.035.

Additives

The rubber composition according to the present technology may further contain an additive to the extent that the object of the present technology is not impeded. Examples of such additives include diene rubbers other than acrylonitrile butadiene rubber, a vulcanization accelerator other than an aldehyde-ammonia vulcanization accelerator, a plasticizer other than a fatty acid diester, an anti-aging agent, an antioxidant, an antistatic agent, a flame retardant, a vulcanizing agent such as sulfur, or an adhesive aid. There is no particular limitation on the additives. Examples include conventionally known additives. The content of additives is not particularly limited, and may be selected as desired.

Production Method, Application, Etc.

There is no particular limitation on the method of producing the rubber composition according to the present technology. One example is a method in which the NBR, filler, resorcin-formaldehyde precondensate, fatty acid diester, and additives (other than vulcanizing agents or vulcanization accelerators) that may be used as necessary are kneaded at 40 to 200° C. using a closed mixer, such as a Banbury mixer or a kneader, or a kneading roll after which a vulcanizing agent, aldehyde-ammonia vulcanization accelerator, and, as necessary, a vulcanization accelerator other than an aldehyde-ammonia vulcanization accelerator are added to the mixture obtained via said kneading, and the whole is kneaded at 40 to 120° C. using a closed mixer, a kneading roll, or the like to produce a rubber composition.

There is no particular limitation on the conditions under which the rubber composition according to the present technology is vulcanized or crosslinked. For example, the rubber composition according to the present technology can be vulcanized or crosslinked under pressure at 110 to 160° C.

The rubber composition according to the present technology can be used to manufacture a hose. An example of a preferred aspect is one in which the rubber composition according to the present technology is used in particular in an inter-layer rubber layer used to secure a reinforcing layer.

Examples of the material used for the reinforcing layer includes fiber materials such as polyester fibers, polyamide fibers, and aramid fibers; and hard steel wire such as brass-plated wire or zinc-plated wire.

Hose

The hose according to the present technology is a hose including a layer formed using the rubber composition according to the present technology.

There is no particular limitation on the rubber composition used for the hose according to the present technology as long as it is the rubber composition of the present technology.

The layer formed using the rubber composition for hoses may be any layer of the hose.

An example of the hose according to the present technology is a hose including an inner tube, a reinforcing layer, and an outer tube in that order, the reinforcing layer including a reinforcing steel wire layer and an inter-layer rubber layer. In this case, the layer formed using the rubber composition for hoses can be at least one selected from the group consisting of the inner tube, the outer tube, and the inter-layer rubber layer.

An example of a preferred aspect is one in which at least the inter-layer rubber layer is formed using the rubber composition according to the present technology.

The inter-layer rubber layer can be disposed on one or both sides of the reinforcing steel wire layer.

The reinforcing layer may include one or multiple reinforcing steel wire layers. If there are multiple reinforcing steel wire layers, the inter-layer rubber layer can be disposed between the multiple reinforcing steel wire layers.

In the present technology, the reinforcing steel wire layer may be, for example, a fiber layer made of the abovementioned fiber materials.

An example of a preferred aspect is one in which the reinforcing layer includes at least one reinforcing steel wire layer.

Inner Tube

A known rubber composition can be used as the rubber material forming the inner tube. A specific example is an NBR rubber composition.

The inner tube can have one or multiple layers.

An adhesive layer or the like may be provided between the inner tube and the reinforcing steel wire layer adjacent to the inner tube.

Reinforcing Layer

An example of a preferred aspect is one in which the reinforcing steel wire layer used in the reinforcing layer is formed by braiding reinforcing steel wire such as wire.

An example of reinforcing steel wire is hard steel wire normally used in hoses. Specific examples include brass-plated wire and zinc-plated wire.

There is no particular limitation on the method of braiding the reinforcing steel wire layer. Examples include a braided layer and a spiral-shaped layer.

Outer Tube

A conventionally known rubber composition can be used as the rubber material forming the outer tube. Specific examples include a styrene-butadiene rubber composition, a chloroprene rubber composition, and an ethylene-propylene diene rubber composition.

The outer tube can have one or multiple layers.

An adhesive layer or the like may be provided between the outer tube and the reinforcing steel wire layer adjacent to the outer tube.

The hose according to the present technology will now be described on the basis of the preferred embodiment illustrated in the attached drawing. The hose according to the present technology is not limited to the preferred embodiment illustrated in the drawing.

FIG. 1 is a partial cut-away perspective view of the layers of one example of a hose according to the present technology.

In FIG. 1, a hose 1 includes an inner tube 2, a reinforcing layer, and an outer tube 3, and the reinforcing layer includes reinforcing steel wire layers 5a and 5b and an inter-layer rubber layer 4. The inter-layer rubber layer 4 is disposed between the multiple reinforcing steel wire layers 5a and 5b. In the hose 1, at least the inter-layer rubber layer 4 can be formed using the rubber composition according to the present technology.

There is no particular limitation on the method of manufacturing the hose according to the present technology. An example is the following method.

First, the inner tube is formed by extruding inner tube material from an inner tube rubber material rubber extruder onto a mandrel to which a release agent has been applied in advance.

Next, the reinforcing steel wire layer is formed on the inner tube (or on the adhesive layer if one is present). A reinforcing steel wire layer may be formed by drawing and braiding a plurality of reinforcing wires into a spiral or braided shape. An inter-layer rubber sheet manufactured in advance by rolling the rubber composition according to the present technology is then wrapped over the reinforcing steel wire layer to form the inter-layer rubber layer. A reinforcing steel wire layer is then formed on the inter-layer rubber layer. If the hose according to the present technology includes three or more reinforcing steel wire layers, the reinforcing steel wire layers and inter-layer rubber layers are repeatedly formed multiple times, as necessary, as in the method described above.

If the hose according to the present technology includes an outer tube, the outer tube is formed by extruding outer tube material onto the reinforcing layer as in the case of the inner tube.

The layers can be subsequently bonded by performing vulcanization (such as steam vulcanization, oven vulcanization (heat vulcanization), or hot water vulcanization) to manufacture the hose according to the present technology.

The temperature during the vulcanization is preferably 130 to 160° C.

If the rubber composition according to the present technology is used for the hose according to the present technology, the hose according to the present technology includes a layer formed using the rubber composition according to the present technology. Thus, the hose has a superior appearance, and dimensional stability and precision due to the flowability of the rubber composition according to the present technology being suppressed during the manufacturing process.

If the rubber composition according to the present technology is used for the inter-layer rubber layer in particular of the hose according to the present technology, the hose according to the present technology will include a layer formed using the rubber composition according to the present technology as the inter-layer rubber layer; thus, there will be no seepage, or only little seepage, of the inter-layer rubber from the reinforcing layer in the unvulcanized hose and during the initial phase of vulcanization, and the hose will have a superior appearance and dimensional stability/precision, due to the fluidity of the rubber composition according to the present technology being suppressed during the manufacturing process.

The hose according to the present technology can be advantageously used, for example, as a high-pressure rubber hose such as a hydraulic hose, a refrigerant-transporting hose, etc.

EXAMPLES

The present technology will now be described in detail using examples; however, the present technology is not limited to these examples.

Production of Rubber Composition

The components (apart from the vulcanizing agent (sulfur) and aldehyde-ammonia vulcanization accelerator) set forth in Table 1 below were kneaded using a closed mixer at 40 to 160° C. according to the compositions (part by mass) set forth in said table. Then, a vulcanizing agent and aldehyde-ammonia vulcanization accelerator were added thereto, and the whole was kneaded at 40 to 120° C. to produce rubber compositions.

Evaluation

The following flow amount evaluation was performed using the rubber compositions produced as described above. The results are shown in Table 1.

Flow Amount (Flowability of Unvulcanized Rubber)

A mold including a chamber having a tubule (orifice) having length (L) of 15 mm and a diameter (D) of 1.5 mm, a cylinder capable of pressurizing an unvulcanized rubber composition filling the chamber, and a cavity for holding rubber flowing out through the orifice was used.

In the chamber, 40 g of the rubber compositions (unvulcanized) produced as described above were placed and the cylinder was compressed for 20 minutes at 150° C. and 1.5 MPa. After 20 minutes, the mass of vulcanized rubber held in the cavity was measured.

The volume of the vulcanized rubber was calculated by dividing the value obtained via this measurement by the specific gravity of the vulcanized rubber, and designated as flow amount (unit: mL).

A smaller flow amount value indicates lower flowability and better suppression of flowability.

TABLE 1

| | Examples | | | | |
|---|---|---|---|---|---|
| | 1 | 2 | 3 | 4 | 5 |
| NBR 1 (AN % = 21, Vm: 65) | 50 | 50 | 50 | 50 | 50 |
| NBR 2 (AN % = 18, Vm: 45) | 50 | 50 | 50 | 50 | 50 |
| Carbon black 1 (HAF) | 35 | 35 | 35 | 35 | 35 |
| Carbon black 2 (FTF) | 50 | 50 | 50 | 50 | 50 |
| Silica | 21.5 | 21.5 | 21.5 | 21.5 | 5 |
| (Carbon black 1 + 2)/silica | 4.0 | 4.0 | 4.0 | 4.0 | 17 |
| Total filler content | 106.5 | 106.5 | 106.5 | 106.5 | 90 |
| Comparison plasticizer (DOP) | | | | | |
| Fatty acid diester 1 | 5 | 10 | 12.5 | 15 | 10 |
| Resorcin (comparison) | | | | | |
| Resorcin-formaldehyde precondensate 1 | 2.5 | 2.5 | 2.5 | 2.5 | 2.5 |
| Sulfur | 2.6 | 2.6 | 2.6 | 2.6 | 2.6 |
| Aldehyde-ammonia vulcanization accelerator | 1.7 | 1.7 | 1.7 | 1.7 | 1.7 |
| Resorcin/resorcin-formaldehyde condensate (mass ratio) | 25/75 | 25/75 | 25/75 | 25/75 | 25/75 |
| Flow amount (unit: mL) | 1.6 | 2.4 | 3.1 | 4.0 | 4.6 |

| | Examples | | | | |
|---|---|---|---|---|---|
| | 6 | 2 | 7 | 8 | 2 |
| NBR 1 (AN % = 21, Vm: 65) | 50 | 50 | 50 | 50 | 50 |
| NBR 2 (AN % = 18, Vm: 45) | 50 | 50 | 50 | 50 | 50 |
| Carbon black 1 (HAF) | 35 | 35 | 35 | 35 | 35 |
| Carbon black 2 (FTF) | 50 | 50 | 50 | 50 | 50 |
| Silica | 15 | 21.5 | 30 | 21.5 | 21.5 |
| (Carbon black 1 + 2)/silica | 5.7 | 4.0 | 2.8 | 4.0 | 4.0 |
| Total filler content | 100 | 106.5 | 115 | 106.5 | 106.5 |
| Comparison plasticizer (DOP) | | | | | |
| Fatty acid diester 1 | 10 | 10 | 10 | 10 | 10 |
| Resorcin (comparison) | | | | | |
| Resorcin-formaldehyde precondensate 1 | 2.5 | 2.5 | 2.5 | 2.5 | 2.5 |
| Sulfur | 2.6 | 2.6 | 2.6 | 2.6 | 2.6 |
| Aldehyde-ammonia vulcanization accelerator | 1.7 | 1.7 | 1.7 | 1 | 1.7 |
| Resorcin/resorcin-formaldehyde condensate (mass ratio) | 25/75 | 25/75 | 25/75 | 25/75 | 25/75 |
| Flow amount (unit: mL) | 3.9 | 2.4 | 1.3 | 2.7 | 2.4 |

| | Examples | | | | |
|---|---|---|---|---|---|
| | 9 | 2 | 10 | 11 | 12 |
| NBR 1 (AN % = 21, Vm: 65) | 50 | 50 | 50 | 50 | 50 |
| NBR 2 (AN % = 18, Vm: 45) | 50 | 50 | 50 | 50 | 50 |
| Carbon black 1 (HAF) | 35 | 35 | 35 | 35 | 35 |
| Carbon black 2 (FTF) | 50 | 50 | 50 | 50 | 50 |
| Silica | 21.5 | 21.5 | 21.5 | 21.5 | 21.5 |

TABLE 1-continued

|  | | | | | |
|---|---|---|---|---|---|
| (Carbon black 1 + 2)/silica | 4.0 | 4.0 | 4.0 | 4.0 | 4.0 |
| Total filler content | 106.5 | 106.5 | 106.5 | 106.5 | 106.5 |
| Comparison plasticizer (DOP) | | | | | |
| Fatty acid diester 1 | 10 | 10 | 10 | 10 | 10 |
| Resorcin (comparison) | | | 0.17 | 0.5 | 0.83 |
| Resorcin-formaldehyde precondensate 1 | 2.5 | 2.5 | 2.33 | 2 | 1.67 |
| Sulfur | 2.6 | 2.6 | 2.6 | 2.6 | 2.6 |
| Aldehyde-ammonia vulcanization accelerator | 2 | 1.7 | 1.7 | 1.7 | 1.7 |
| Resorcin/resorcin-formaldehyde condensate (mass ratio) | 25/75 | 25/75 | 30/70 | 40/60 | 50/50 |
| Flow amount (unit: mL) | 3.0 | 2.4 | 2.5 | 2.6 | 3.2 |

| | Comparative Examples | | | | |
|---|---|---|---|---|---|
| | 1 | 2 | 3 | 4 | 5 |
| NBR 1 (AN % = 21, Vm: 65) | 50 | 50 | 50 | 50 | 50 |
| NBR 2 (AN % = 18, Vm: 45) | 50 | 50 | 50 | 50 | 50 |
| Carbon black 1 (HAF) | 35 | 35 | 35 | 35 | 35 |
| Carbon black 2 (FTF) | 50 | 50 | 50 | 50 | 50 |
| Silica | 21.5 | 21.5 | 21.5 | 21.5 | 21.5 |
| (Carbon black 1 + 2)/silica | 4.0 | 4.0 | 4.0 | 4.0 | 4.0 |
| Total filler content | 106.5 | 106.5 | 106.5 | 106.5 | 106.5 |
| Comparison plasticizer (DOP) | 10 | | 10 | | |
| Fatty acid diester 1 | | 10 | | 12.5 | 15 |
| Resorcin (comparison) | 2.5 | 2.5 | | 2.5 | 2.5 |
| Resorcin-formaldehyde precondensate 1 | | | 2.5 | | |
| Sulfur | 2.6 | 2.6 | 2.6 | 2.6 | 2.6 |
| Aldehyde-ammonia vulcanization accelerator | 1.7 | 1.7 | 1.7 | 1.7 | 1.7 |
| Resorcin/resorcin-formaldehyde condensate (mass ratio) | 100/0 | 100/0 | 25/75 | 100/0 | 100/0 |
| Flow amount (unit: mL) | 3.1 | 3.4 | 3.5 | 4.0 | 4.3 |

The details of the components set forth in Table 1 are as follows.

NBR 1: Nipol DN405, produced by Zeon Corporation

NBR 2: PERBUNAN NT1846F, produced by LANXESS

The acrylonitrile contents (AN %; unit: mass %) and Mooney viscosities (Vm) at 100° C. of these NBRs are as shown in Table 1.

Carbon black 1 (HAF): HAF-grade carbon black (furnace black), SHOBLACK N330, produced by Cabot Japan K.K.; average particle size: 26 to 30 μm Carbon black 2 (FTF): FTF-grade carbon black (thermal black), Asahi Thermal, produced by Asahi Carbon Co., Ltd.; average particle size: 90 to 206 μm Silica: Nipsil VN3, produced by Tosoh Silica Corporation Comparison plasticizer (DOP): dioctyl phthalate, produced by J-PLUS Co., Ltd.

Fatty acid diester 1: adipic acid dioctyl ester, produced by J-PLUS Co., Ltd.

Resorcin (comparison): Resorcinol, produced by Sumitomo Chemical Co., Ltd.

Resorcin-formaldehyde precondensate 1: Penaclite Resins B-18-S (produced by INDSPEC Chemical Corporation); novolac resorcin-formaldehyde precondensate. Penaclite Resins B-18-S is a mixture containing 25 mass % resorcin and 75 mass % resorcin-formaldehyde condensate.

The softening point of Penaclite Resins B-18-S is 100 to 110° C.

The water content of Penaclite Resins B-18-S is 1.0 mass % or less.

Penaclite Resins B-18-S does not contain rubber latex.

Sulfur: Powdered sulfur, produced by Hosoi Chemical Industry Co., Ltd.

Aldehyde-ammonia vulcanization accelerator: hexamethylene tetramine, NOCCELER H, produced by Ouchi Shinko Chemical Industrial Co., Ltd.

A comparison of Comparative 1 and 2, which contain resorcin instead of a resorcin-formaldehyde precondensate as shown in Table 1, showed that Comparative Example 2, which contains a fatty acid diester, had a greater flow amount and even greater flowability than Comparative Example 1, which contains DOP.

Comparative Example 3, which contains a resorcin-formaldehyde precondensate but contains DOP instead of a fatty acid diester, had a greater flow amount and even greater flowability than Comparative Examples 1 and 2.

Comparative Examples 4 and 5, which contain resorcin instead of a resorcin-formaldehyde precondensate, and have a greater fatty acid diester content than Comparative Example 2, had a greater flow amount and even greater flowability than Comparative Example 2.

In contrast, Examples 1 to 12 were capable of yielding the prescribed effects.

Specifically, a comparison of Example 2, which contains a resorcin-formaldehyde precondensate, and Comparative Example 3 showed that Example 2, which contains a fatty acid diester, had a smaller flow amount than Comparative Example 3 which contains DOP, thus indicating suppressed flowability.

In this way, it was revealed that the flowability suppressant effects yielded by a fatty acid diester (Example 2) and DOP (Comparative Example 3) in a rubber composition containing a resorcin-formaldehyde precondensate are the inverse of those yielded by resorcin-containing rubber compositions (Comparative Examples 1, 2).

Example 3 had a smaller flow amount, indicating superior fluidity suppression, than Comparative Example 4, which contains resorcin instead of a resorcin-formaldehyde precondensate.

Example 4 had a smaller flow amount, indicating superior fluidity suppression, than Comparative Example 5, which contains resorcin instead of a resorcin-formaldehyde precondensate.

A comparison of Examples 1 to 4 shows that flow amount decreases, indicating superior flowability suppression, as fatty acid diester content decreases.

A comparison of Examples 2 and 5 to 7 in terms of silica content shows that flowability suppression increased as silica content increased.

A comparison of Example 2 and Examples 8 and 9 in terms of aldehyde-ammonia vulcanization accelerator content shows that flowability suppression increased if the aldehyde-ammonia vulcanization accelerator content was greater than 1 part by mass and less than 2 parts by mass per 100 parts by mass of the acrylonitrile butadiene rubber (Example 2), or greater than 1 part by mass and less than 2 parts by mass per 100 total parts by mass of the acrylonitrile butadiene rubber and resorcin-formaldehyde precondensate (Example 2).

A comparison of Examples 2 and 10 to 12 in terms of the resorcin-formaldehyde condensate content of the resorcin-formaldehyde precondensate shows that flowability suppression increased as resorcin-formaldehyde condensate content increased.

The invention claimed is:

1. A rubber composition for hoses, comprising: acrylonitrile butadiene rubber, a filler, a resorcin-formaldehyde precondensate, an aldehyde vulcanization accelerator, and a fatty acid diester,
   wherein the resorcin-formaldehyde precondensate does not contain rubber latex.

2. The rubber composition for hoses according to claim 1, wherein the total number of carbon atoms making up the fatty acid diester is at least 12.

3. The rubber composition for hoses according to claim 1, wherein a fatty acid diester content is 5 to 15 parts by mass per 100 parts by mass of the acrylonitrile butadiene rubber.

4. A hose comprising a layer formed using the rubber composition for hoses according to claim 1.

5. The rubber composition for hoses according to claim 2, wherein a fatty acid diester content is 5 to 15 parts by mass per 100 parts by mass of the acrylonitrile butadiene rubber.

6. The rubber composition for hoses according to claim 1, comprising only the aldehyde-ammonia vulcanization accelerator as a vulcanization accelerator.

7. A rubber composition for hoses, comprising: acrylonitrile butadiene rubber, a filler, a resorcin-formaldehyde precondensate, an aldehyde-ammonia vulcanization accelerator, and a fatty acid diester, wherein the rubber composition for hoses does not contain rubber latex.

8. The rubber composition for hoses according to claim 1, comprising only the acrylonitrile butadiene rubber as a rubber component.

* * * * *